United States Patent
Idel et al.

(10) Patent No.: US 6,515,044 B1
(45) Date of Patent: Feb. 4, 2003

(54) METHOD FOR PRODUCING HIGHLY VISCOUS POLYESTERS

(75) Inventors: Karsten-Josef Idel, Krefeld (DE); Hans-Jürgen Dietrich, Frankfurt (DE); Matthias Müller, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/786,712

(22) PCT Filed: Sep. 7, 1999

(86) PCT No.: PCT/EP99/06575

§ 371 (c)(1),
(2), (4) Date: Apr. 9, 2001

(87) PCT Pub. No.: WO00/15693

PCT Pub. Date: Mar. 23, 2000

(30) Foreign Application Priority Data

Sep. 15, 1998 (DE) .......................................... 198 42 152

(51) Int. Cl.⁷ ........................... C08J 3/22; C08G 73/08; C08L 67/00

(52) U.S. Cl. ...................... 523/351; 524/602; 525/397; 528/289

(58) Field of Search .......................... 523/351; 524/602; 525/397; 528/289

(56) References Cited

U.S. PATENT DOCUMENTS

| | | | |
|---|---|---|---|
| 3,193,522 A | 7/1965 | Neumann et al. | 260/45.9 |
| 3,193,523 A | 7/1965 | Neumann et al. | 260/45.9 |
| 3,563,847 A | 2/1971 | Rye et al. | 161/176 |
| 3,835,098 A | 9/1974 | Brown et al. | 260/75 N |
| 4,351,936 A | 9/1982 | Matsumura et al. | 528/289 |
| 5,049,603 A * | 9/1991 | Mochizuki | |
| 5,173,357 A * | 12/1992 | Nakane et al. | |
| 5,324,795 A * | 6/1994 | Suenaga | |
| 5,610,242 A | 3/1997 | Birnbrich et al. | 525/444.5 |
| 6,096,818 A * | 8/2000 | Nakaura et al. | |

FOREIGN PATENT DOCUMENTS

| | | |
|---|---|---|
| EP | 0438128 | 7/1991 |
| EP | 486 916 | 2/1998 |
| GB | 1139379 | 3/1967 |
| WO | 96/40821 | 12/1996 |

OTHER PUBLICATIONS

*Patent Abstracts of Japan, vol. 018, No. 075, (C–1163), Feb. 8, 1994, & JP 05 287067 A (Toray Ind Inc), Nov. 2, 1993 Zusammenfassung.

Angew. Chem., 78, Oct., 1966, pp. 913–927, Seeliger et al, "Neuere Synthesen und Reaktionen Cyclischer Imidsäureester".

Chem. Rev., 71, (month unavailable), 1971, pp. 483–505, John A. Frump, "Oxazolines. Their Preparation, Reactions, and Applications".

* cited by examiner

*Primary Examiner*—Tae H. Yoon
(74) *Attorney, Agent, or Firm*—Joseph C. Gil; Aron Preis

(57) ABSTRACT

The present invention relates to a process for the preparation of high-viscosity polyesters with a reduced content of acid end groups, wherein a masterbatch of low-viscosity polyesters and oxazolines is prepared, this is then mixed with a higher-viscosity polyester and this mixture (dry blend) is further processed.

13 Claims, No Drawings

METHOD FOR PRODUCING HIGHLY VISCOUS POLYESTERS

The present invention relates to a process for the preparation of high-viscosity polyesters with a reduced content of acid end groups, in which a masterbatch is prepared from low-viscosity polyesters and oxazolines, this is then mixed with a higher-viscosity polyester and this mixture (dry blend) is further processed.

Polyesters with masked carboxyl end groups are already known. Various compounds which react with carboxyl groups are employed here for masking the carboxyl end groups.

It is thus known that polyesters which have free carboxyl end groups can react with oxazolines, the ring being opened (U.S. Pat. No. 4,351,936, DE-A 42 25 627). For example, $\Delta^2$-oxazolines substituted in the 2-position react with carboxyl groups to give ester-amides of aminoethanol (Chem. Rev. 71, 483–505, 1971 and Angew. Chem. 78, 913–927, 1966).

Another method of masking carboxyl groups comprises reacting polyesters which have free carboxyl end groups with epoxides, ester groups being formed from the carboxyl groups (BP 1 139 379). It is furthermore known to mask carboxyl groups by reaction with carbodiimides (U.S. Pat. Nos. 3,193,522, 3,193,523, 3,835,098). Monoacylated ureas are first formed here from the carboxyl groups, and these stabilize by further rearrangements. A serious disadvantage of the two methods mentioned last is the relatively high toxicity of the masking reagents and of the rearrangement and cleavage products formed, which necessitates observance of particular safety precautions when carrying out the masking reaction.

It is also known to mask carboxyl end groups of polyesters by reaction with polycarbonates (U.S. Pat. No. 3,563,847, EP 0 486 916 B1). In this case polycarbonate units are bonded to the polyester molecule via ester groups.

The aim of the masking reactions is a reduction in the number of free carboxyl groups of the polyester. Polyesters with a reduced number of carboxyl end groups show a significantly improved stability towards hydrolysis. Polyesters with a reduced content of acid end groups furthermore also show a better heat stability and resistance to chemicals under mechanical stress. The use of multifunctional masking reagents can lead to an increase in the molecular weight of the polyester.

The following processes e.g. are known for masking carboxyl end groups with oxazolines:

1. The masking reagent is added during the preparation of the polyester resin, after the desired molecular weight has been reached at the end of the melt polycondensation reaction.
2. The masking reagent is mixed with the polyester granules and is incorporated into the polyester by a subsequent compounding step.

A disadvantage of the processes mentioned is that they are suitable only for stabilizing low-viscosity polyesters with low degrees of condensation. For technical and kinetic reasons, high-viscosity polyesters with high degrees of polymerization (high molecular weights) are usually prepared by after-condensation in the solid phase from a low-viscosity polyester base resin. Further processing steps which are accompanied by melting of the polyester lead to a molecular weight degradation in polyesters obtained by after-condensation, and therefore to a deterioration in the mechanical and physical properties.

Another disadvantage of the process described in which an oxazoline masking reagent is incorporated into the polyester by compounding is the unsatisfactory reactivity of oxazolines, and here in particular of phenyl-substituted oxazolines, in order to effect an adequate reduction of the carboxyl end group content in the period of time typical for a compounding step.

A process has now been found for the preparation of high-viscosity polyester resins with a reduced content of carboxyl end groups and improved stability to hydrolysis without degradation of the molecular weight. The polyesters according to the invention furthermore also have a better heat stability and resistance to chemicals under mechanical stress.

One advantage of the process according to the invention is that no additional melting step on the high-viscosity polyester, which would lead to damage to the polyester, is required for incorporation of the oxazoline into the high-viscosity polyester. At the same time, by two processing steps in the melt a sufficiently long reaction time for masking the carboxyl end groups is provided for the masking reagent (oxazoline). Another advantage of the process according to the invention is that when multifunctional oxazolines are employed, a build up in the molecular weight of the high-viscosity polyesters is found.

The invention thus provides a process for the preparation of high-viscosity polyesters, which is characterized in that a masterbatch of a low-viscosity polyester and an oxazoline compound is mixed with a higher-viscosity polyester to form a dry blend and the dry blend is then further processed. Dry blend is understood here as meaning a physical mixture of solid thermoplastics (granules or powder).

The masterbatch of low-viscosity polyester and oxazoline compound is prepared by mixing the individual components and then compounding the mixture. The mixing of the individual components is conventionally carried out in the temperature range between 0 to 50° C. (preferably room temperature). The compounding operation is in general carried out at temperatures of 170 to 380° C., preferably 200 to 220° C.

The mixing of the higher-viscosity polyester with the masterbatch of low-viscosity polyester and oxazoline to form a dry blend can be carried out both at temperatures below and at those above room temperature. Temperatures in the range between 0 to 50° C. are possible. The mixing is preferably carried out at room temperature. One advantage of this mixture (dry blend) is that it is stable towards demixing.

The further processing of the mixture (dry blend) of higher-viscosity polyester and masterbatch is carried out by conventional methods, for example by compounding, extrusion, blow moulding, extrusion blow moulding, injection moulding, kneading or calendering, in general at temperatures of 200 to 300° C., the temperature range being adapted to the particular processing technique.

Further processing of the mixture (dry blend) can be carried out to give granules, semi-finished products (e.g. films, cable sheathings, sheets, profiles, pipes) or mouldings of all types.

The relative solution viscosities of the higher- and low-viscosity polyesters are chosen such that the difference in the relative solution viscosities of the higher- and low-viscosity polyester is at least 0.05, preferably at least 0.1, in particular at least 0.15.

The effect according to the invention also occurs with significantly greater viscosity differences. A difference in $\eta_{rel}$ of 0.7 may be mentioned by way of example.

The low-viscosity polyesters in general have a relative solution viscosity ($\eta_{rel}$) of less than 1.90, preferably less than 1.75.

The higher-viscosity polyesters in general have a relative solution viscosity of greater than 1.50, preferably greater than 1.75.

The relative solution viscosity ($\eta_{rel}$) is determined on 5 g polymer per liter in phenol/ortho-dichlorobenzene (1:1 parts by wt.) at a temperature of 25° C.

The content of oxazoline compound in the masterbatch is in general 5 to 60 wt. %, preferably 10 to 40 wt. % (based on the masterbatch).

The content of oxazoline compound in the high-viscosity polyester after processing of the dry blend is in general 0.02 to 10, preferably 0.05 to 5, in particular 0.1 to 2 wt. %, based on the polyester and masterbatch.

One or a mixture of oxazoline compounds can be added.

Possible oxazoline compounds are, for example, those mentioned in DE-A 4 129 980, DE-A 42 25 627 and WO 96/11 978. The disclosure of these patent applications is therefore counted with the disclosure of the present invention in this respect.

The oxazolines described in WO 96/11 978, page 14, last paragraph to page 17, bottom, and DE-A 41 29 980, page 5, lines 20 to 66 are preferably employed.

Oxazolines which are particularly preferred are the tautomeric forms of the monooxazolines of the formulae

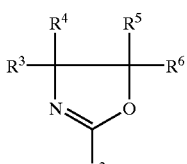

2-oxazolines (I)

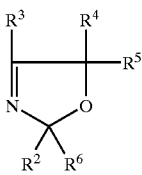

3-oxazolines (II)

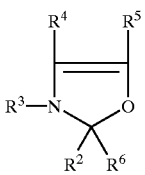

4-oxazolines (III)

and bisoxazolines of the general formula (IV)

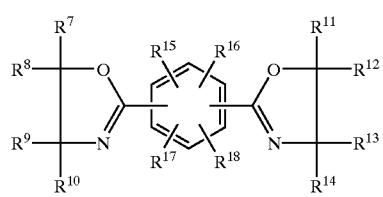

(IV)

in which the substituents $R^2$ to $R^6$ independently of one another can have the following meaning:

hydrogen atoms, alkyl, alkenyl, aryl, hydroxyalkyl, hydroxyaryl, alkoxyalkyl, alkoxyaryl, alkyl ester, aryl ester, acyloxyalkyl, acyloxyaryl, halogenoalkyl, halogenoaryl, nitroalkyl, nitroaryl, benzamidoalkyl, benzamidoaryl, hydroxyaminocarbonyl, perhaloalkyl, perhaloaryl, halogen, amino, vinyl or mercapto groups, wherein the alkyl radicals in each case have 1 to 22 C atoms, the alkenyl radical 2 to 22 C atoms and the aryl radicals 6 to 14 C atoms.

Mixtures of different oxazolines can also be employed. Of the monooxazolines, 2-oxazolines are preferred, in particular those in which $R^2$ represents alkyl, alkenyl or hydroxyalkyl, $R^3$, $R^4$ represent alkyl, hydroxyalkyl or alkoxyalkyl and $R^5$, $R^6$ represent hydrogen atoms or alkyl or hydroxyalkyl groups wherein the alkyl radicals preferably have 1 to 18 C atoms and the alkylene radicals 2 to 18 C atoms.

Of the bisoxazolines of the general formula (IV), those which are built up symmetrically (i.e. $R^7=R^{11}$, $R^8=R^{12}$, $R^9=R^{13}$ and $R^{10}=R^{14}$) and are in the meta- or para-position on the aromatic ring may be mentioned in particular. There are to be mentioned in particular 2,2'-p-phenylene-bis(4,4'-dimethyl-2-oxazoline), 2,2'-p-phenylene-bis(4-phenyl-2-oxazoline), 2,2'-m-phenylene-bis(2-oxazoline), 2,2'-m-phenylene-bis(4-methyl-2-oxazoline), 2,2'-m-phenylene-bis(4,4'-dimethyl-2-oxazoline) and 2,2'-m-phenylene-bis(4-phenyl-2-oxazoline), as well as 2,2'-m-phenylene-bis(4-phenyl-2-oxazoline), and the particularly preferred 2,2'-p-phenylene-bis(2-oxazoline) and 2,2'-m-phenylene-bis(2-oxazoline).

Polyalkylene terephthalates are preferably employed as the polyesters.

Polyalkylene terephthalates in the context of the invention are reaction products of aromatic dicarboxylic acids or their reactive derivatives (e.g. dimethyl esters or anhydrides) and aliphatic, cycloaliphatic or araliphatic diols and mixtures of these reaction products.

Preferred polyalkylene terephthalates can be prepared from terephthalic acid (or its reactive derivatives) and aliphatic or cycloaliphatic diols having 2 to 10 C atoms by known methods (Kunststoff-Handbuch, vol. VIII, p. 695 et seq., Carl-Hanser-Verlag, Munich 1973).

Preferred polyalkylene terephthalates contain at least 80, preferably 90 mol %, based on the dicarboxylic acid, of terephthalic acid radicals and at least 80, preferably at least 90 mol %, based on the diol component, of ethylene glycol, propane-1,3-diol and/or butane-1,4-diol radicals.

The preferred polyalkylene terephthalates can contain, in addition to terephthalic acid radicals, up to 20 mol % of radicals of other aromatic dicarboxylic acids having 8 to 14 C atoms or aliphatic dicarboxylic acids having 4 to 12 C atoms, such as radicals of phthalic acid, isophthalic acid, naphthalene-2,6-dicarboxylic acid, 4,4'-diphenyldicarboxylic acid, succinic, adipic or sebacic acid, azelaic acid or cyclohexanediacetic acid.

The preferred polyalkylene terephthalates can contain, in addition to ethylene glycol radicals and butane-1,4-diol radicals, up to 20 mol % of other aliphatic diols having 3 to 12 C atoms or cycloaliphatic diols having 6 to 21 C atoms, e.g. radicals of propane-1,3-diol, 2-ethylpropane-1,3-diol, neopentylglycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and -1,6-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4- hydroxypropoxyphenyl)-propane (DE-OS 24 07 674, 24 07 776, 27 15 932).

The polyalkylene terephthalates can be branched by incorporation of relatively small amounts of 3- or 4-hydric alcohols or 3- or 4-basic carboxylic acids, such as are described e.g. in DE-OS 19 00 270 and U.S. Pat. No. 3,692,744. Examples of a preferred branching agent are trimesic acid, trimellitic acid, trimethylolethane and -propane and pentaerythritol.

It is advisable to use not more than 1 mol % of the branching agent, based on the acid component.

Particularly preferred polyalkylene terephthalates are those which have been prepared solely from terephthalic acid and reactive derivatives thereof (e.g. dialkyl esters thereof) and ethylene glycol, propane-1,3-diol and/or butane-1,4-diol (polyethylene terephthalate and polybutylene terephthalate) and mixtures of these polyalkylene terephthalates.

Preferred polyalkylene terephthalates are also copolyesters which are prepared from at least two of the abovementioned acid components and/or at least two of the abovementioned alcohol components, and particularly preferred copolyesters are poly-(ethylene glycol/butane-1,4-diol) terephthalates.

Mixtures of high- and low-viscosity polyesters can also be employed.

Conventional additives, such as lubricants and mould release agents, nucleating agents, antistatics, pigments, stabilizers and flameproofing additives, can be added during the further processing.

On the basis of their profile of properties, thermoplastic moulding compositions based on high-viscosity polyesters with low carboxyl end group contents are used in various sectors, for example as sheathings for light wave conductors, cable sheathings, in the automobile sector, in electrical engineering and in the leisure and sports sector.

EXAMPLES

Preparation of the Masterbatch

A mixture of 20 wt. % 1,3-PBO and 80 wt. % low-viscosity polybutylene terephthalate (PBT) with a relative solution viscosity $\eta_{rel}$ of 1.66 are mixed at room temperature and the mixture is then compounded with an extruder of the type ZSK 31/1 at a material temperature of approx. 180–220° C.

Preparation of the Dry Blend

The particular amount of the abovementioned masterbatch is mixed at room temperature with the corresponding amount of high-viscosity PBT with a relative solution viscosity $\eta_{rel}$ of 1.85. The amounts data are listed in table 1.

Final Processing of the Dry Blend

The dry blend is processed to dumbbell-shaped bars (3 mm thick in accordance with ISO 527) in this example by the injection moulding process on an injection moulding machine of the type Arburg 320-210-500 at a material temperature of 240–280° C. and a mould temperature of 80° C. The results of the investigations are to be found in table 1. All the investigations listed in the table are carried out on the abovementioned dumbbell-shaped bars.

1,3-PBO is 2,2'-m-phenylene-bis(2-oxazoline) [IUPAC: 2,2'-(1,3-phenylene)bis(4,5-dihydrooxazole)] from Palmarole (Basle, Switzerland).

The relative solution viscosity $\eta_{rel}$ is determined on a solution of 5 g polymer dissolved in 1 liter phenol/dichlorobenzene (50 wt. % / 50 wt. %) at 25° C. The COOH end groups are determined by dissolving of the sample material in cresol/chloroform and subsequent photometric titration. The elongation at break is measured on the abovementioned dumbbell-shaped bar in a tensile test in accordance with DIN 53455. The hydrolysis experiments are carried out by storage of the abovementioned test specimens in a Varioklav steam sterilizer (type 300/400/500 EP-Z) at 100° C. in a saturated water vapour atmosphere.

As can be seen from table 1, the process according to the invention leads, after the final processing step, to material (A–F) which, compared with standard PBT (comparison 1), has a lower COOH end group content, a slightly increased viscosity and an improved stability to hydrolysis (indicated by high elongation at break values), while retaining the other properties. Comparison 2 in table 1 illustrates that the advantages achieved by the process according to the invention cannot be achieved by admixing pure 1,3-PBO before the final processing step.

TABLE 1

| | | Comparison 1* | Comparison 2** | A | B | C | D | E |
|---|---|---|---|---|---|---|---|---|
| High-viscosity PBT ($\eta_{rel}$ = 1.85) | [%] | 100 | 98.2 | 99 | 98 | 97 | 96 | 95 |
| Masterbatch of 20% 1,3-PBO and 80% low-viscosity PBT ($\eta_{rel}$ = 1.66) | [%] | 0 | — | 1 | 2 | 3 | 4 | 5 |
| 1,3-PBO absolute (calculated) | [%] | 0 | 0.8 | 0.2 | 0.4 | 0.6 | 0.8 | 1.0 |
| $\eta_{rel}$ | | 1.76 | 1.72 | 1.79 | 1.80 | 1.81 | 1.80 | 1.80 |
| COOH end groups | [mmol kg$^{-1}$] | 29 | n.m. | 23 | 18 | 13 | 11 | 8 |
| Elongation at break before hydrolysis | [%] | 309 | 300 | 308 | 265 | 303 | 311 | 304 |
| Elongation at break after hydrolysis (3 days) | [%] | 100 | 70 | 165 | 232 | 254 | 225 | 180 |
| Elongation at break after hydrolysis (7 days) | [%] | 30 | 20 | 70 | 109 | 92 | 80 | 82 |
| Elongation at break after hydrolysis (10 days) | [%] | 5 | 10 | 23 | 49 | 44 | 49 | 53 |

*All investigations as in comparison 2 and A–E on dumbell-shaped bars produced by injection moulding
**Production of the dumbbell-shaped bars by injection moulding of a mixture of 0.8% pure 1,3-PBO (instead of the masterbatch) and 98.2% PBT
n.m. not measured

What is claimed is:

1. A process for preparing a dry blend of polyesters comprising mixing in the temperature range of 0 to 50° C. a first polyester having relative solution viscosity of less than 1.75 with an oxazoline compound to form a mixture and compounding the resulting mixture at 170 to 380° C. to form a masterbatch and mixing the masterbatch at 0 to 50° C. with a second polyester having relative solution viscosity greater than 1.75, in solid form to form a dry blend, the relative solution viscosity of said first polyester differing from the relative solution viscosity of said second polyester by at least 0.05 the relative solution viscosity, both occurrences determined on a 5 gm polymer per liter in phenol/ortho-dichlorobenzene (1:1 parts by wt.) at a temperature of 25° C.

2. The process of claim 1 where the relative solution viscosity of said first polyester differing from the relative solution viscosity of said second polyester by at least 0.1.

3. The process of claim 1 where the relative solution viscosity of said first polyester differing from the relative solution viscosity of said second polyester by at least 0.15.

4. The process of claim 1 wherein the oxazoline compound is present in the masterbatch in an amount of 5 to 60 percent relative to the weigh of the masterbatch.

5. The process of claim 1 wherein the oxazoline compound is present in the dry blend in an amount of 0.02 to 10 percent relative to the weigh of the dry blend.

6. The process of claim 1 wherein the blend is mixed with at least one additive selected from the group consisting of lubricant, mold release agent, nucleating agent, antistatic agent, pigment, stabilizer and flameproofing agent.

7. The dry blend prepared by the process of claim 1.

8. A thermoplastic molding composition comprising the dry blend of claim 7.

9. A molded article comprising the dry blend of claim 7.

10. Process according to claim 5, characterized in that the content of oxazoline is 0.05 to 5 wt. %.

11. Process according to claim 10, characterized in that the content of oxazoline is 0.1 to 2wt. %.

12. A process for preparing a dry blend of polyesters comprising mixing in the temperature range of 0 to 50° C. a first polyalkylene terephthalate having relative solution viscosity of less than 1.75 with an oxazoline compound to form a mixture and compounding the resulting mixture at 170 to 380° C. to form a masterbatch and mixing the masterbatch at 0 to 50° C. with a second polyalkylene terephthalate having relative solution viscosity greater than 1.75, in solid form to form a dry blend, the relative solution viscosity of said first polyalkylene terephthalate differing from the relative solution viscosity of said second polyalkylene terephthalate by at least 0.05 the relative solution viscosity, both occurrences determined on a 5 gm polymer per liter in phenol/ortho-dichlorobenzene (1:1 parts by wt.) at a temperature of 25° C.

13. The dry blend prepared by the process of claim 12.

* * * * *